United States Patent [19]

Delmas

[11] 4,275,505
[45] Jun. 30, 1981

[54] APPARATUS FOR CHECKING DIMENSIONAL TOLERANCES

[75] Inventor: Jean R. Delmas, Vanves, France

[73] Assignee: Microlec S.A., Fribourg, Switzerland

[21] Appl. No.: 113,906

[22] Filed: Jan. 21, 1980

Related U.S. Application Data

[63] Continuation of Ser. No. 937,688, Aug. 28, 1978, abandoned, which is a continuation of Ser. No. 810,674, Jun. 27, 1977, abandoned.

[51] Int. Cl.³ .............................................. G01B 7/02
[52] U.S. Cl. ............................. 33/172 E; 33/DIG. 3; 250/231 R; 250/578
[58] Field of Search ............. 33/125 A, 172 E, 174 L, 33/174 P, DIG. 3; 250/209, 237 R, 578, 231 R

[56] References Cited

U.S. PATENT DOCUMENTS

| | | | |
|---|---|---|---|
| 2,415,179 | 2/1947 | Hurley, Jr. ...................... | 33/DIG. 3 |
| 3,068,746 | 12/1962 | Vawter ........................... | 250/237 R |

FOREIGN PATENT DOCUMENTS 882075  11/1961  United Kingdom ................... 33/174 P Primary Examiner—Richard R. Stearns
Attorney, Agent, or Firm—Abraham A. Saffitz

[57] ABSTRACT

Apparatus for detecting whether a measured dimension deviates from a nominal value by a predetermined increment. It comprises a feeler for following the surface of a component and a variable area window controlled by said feeler. Two pairs of photoelectric receivers are located behind the window and the photoelectric receivers of each pair receive differential illumination through the window. An electronic circuit includes a first trigger circuit which receives as input signal the differential output signal of the first pair of photoreceivers and delivers a first detection signal when this input signal exceeds a predetermined positive value, a second trigger circuit which receives as input signal the differential output signal of the second pair of photoreceivers and delivers a second detection signal when this input signal exceeds a predetermined negative value and a gate connected to said first and second trigger circuits which delivers a third detection signal when the two trigger circuits are simultaneously inoperative.

1 Claim, 7 Drawing Figures

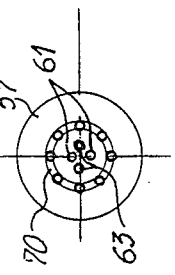
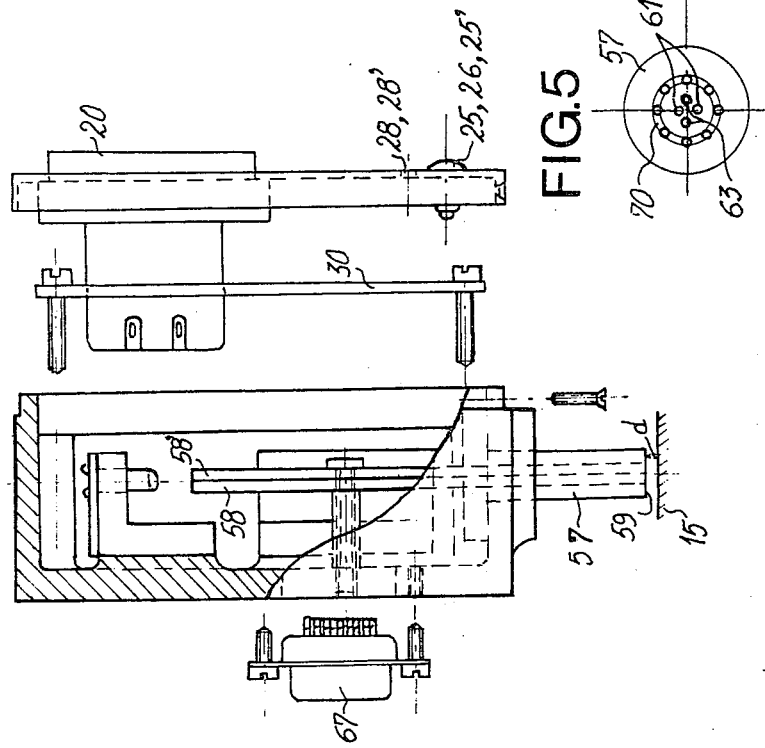
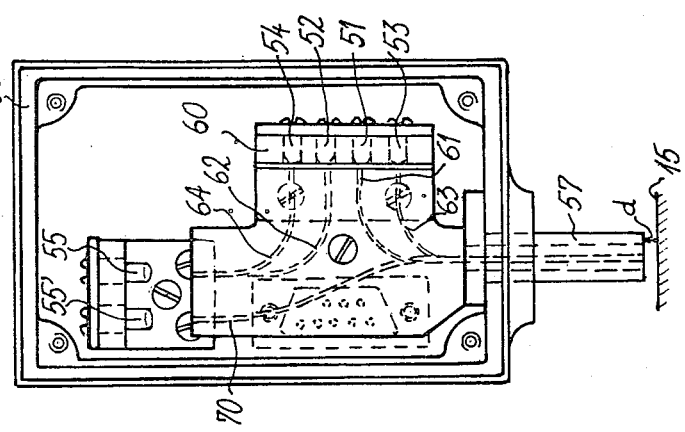

APPARATUS FOR CHECKING DIMENSIONAL TOLERANCES

This is a continuation of application Ser. No. 937,688, now abandoned, filed Aug. 28, 1978 which is a continuation of Ser. No. 810,674 filed June 27, 1977, now abandoned.

BACKGROUND OF THE INVENTION

A. Field of the Invention

This invention relates to a micromeasuring device capable of measuring very small dimensions of the order of 1 micron or less, and capable of checking whether the tolerance of mechanical components has or has not been exceeded in relation to nominal dimensions. The apparatus according to the invention can also be used for positioning a mechanical component according to the position of a control component with a predetermined tolerance.

B. Description of the Prior Art

Apparatuses for detecting the movement of a movable indicating element of a measuring instrument past a predetermined limit position are known in the prior art and, for example, disclosed in British Pat. No. 1,449,776 of Sept. 18, 1974. Such apparatus includes a detection head incorporating two photoelectric receivers for receiving light transmitted, reflected or emitted thereto by the indicating element, the photoelectric receivers being spaced apart in the direction of movement of the indicating element for positioning one on each side of a position corresponding to the predetermined limit position so that, as the indicating element passes the limit position, the photoelectric receivers are consecutively subjected to a change in the light received from the indicating element resulting in differential illumination of the photoelectric receivers; and an electronic circuit which is connected to receive the output signals of the photoelectric receivers and is operative to deliver a detection signal for actuating a signalling device when the movable element passes its limit position in one direction and to cease delivering the detection signal when the movable element moves back past the limit position in the other direction.

Advantageously, the electronic circuit of this prior art apparatus includes a bistable stage so coupled to the photoelectric receivers that, when the indicating element moves past the detection head in the said one direction, the bistable stage is brought from a normal state into an operative state in which it delivers the said detection signal, the bistable stage returning to its normal state only when the indicating element moves back past the detection head in the said other direction. Preferably, the two photoelectric receivers and their load resistors are connected in series between power supply terminals of the electronic circuit and the common point of the two photoelectric receivers is so connected to the input of the bistable stage that the changeover thereof into its operative state occurs only when the indicating element moves in the said one direction past both photoelectric receivers and the return of the bistable stage to its normal state occurs only when the indicating element moves back in the said other direction past both of the photoelectric receivers.

SUMMARY OF THE INVENTION

The object of the present invention is to provide a measuring apparatus having a feeler adapted to follow the surface of mechanical components and deliver a warning signal according to whether the dimension of the mechanical component which is followed by the feeler lies within or outside predetermined limits.

The invention provides apparatus for detecting whether a measured dimension deviates from a nominal value by a predetermined increment, which apparatus includes a feeler for following the surface of a component, said feeler controlling a variable area window, two pairs of photoelectric receivers, each pair of photoelectric receivers receiving differential illumination through said window, and an electronic circuit which comprises a first trigger circuit connected to differentially receive the output signals of the first pair of photoreceivers and is operative to deliver a first detection signal when the input signal due to the differential illumination of said photoreceivers exceeds a predetermined positive value, a second trigger circuit connected to differentially receive the output signals of the second pair of photoreceivers and is operative to deliver a second detection signal when the input signal due to the differential illumination of said photoreceivers exceeds a predetermined negative value and a gate connected to said first and second trigger circuits to deliver a third detection signal when these two trigger circuits are simultaneously inoperative.

BRIEF DESCRIPTION OF THE DRAWINGS

The invention will now be described in detail with reference to the accompanying drawings wherein:

FIGS. 4A and 4B are views of a measuring device according to the invention provided with an optical feeler;

FIG. 5 represents the arrangement of the optical fibres included in the apparatus of FIG. 4A.

DESCRIPTION OF THE PREFERRED EMBODIMENTS

Figure 2:
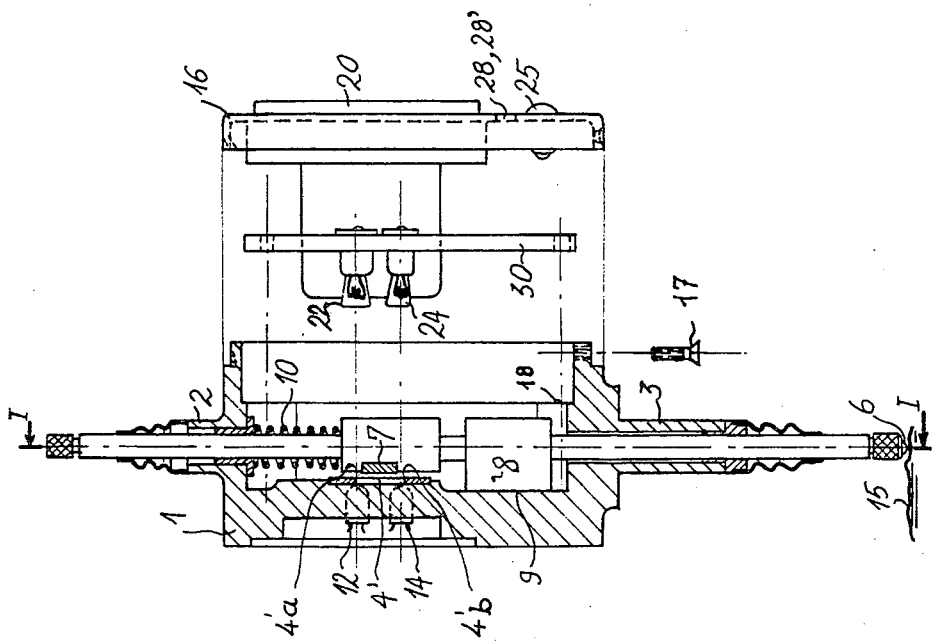
FIGS. 1 and 2 are cross-sectional views of a measuring device according to the invention, provided with a mechanical feeler.
Figure 1:
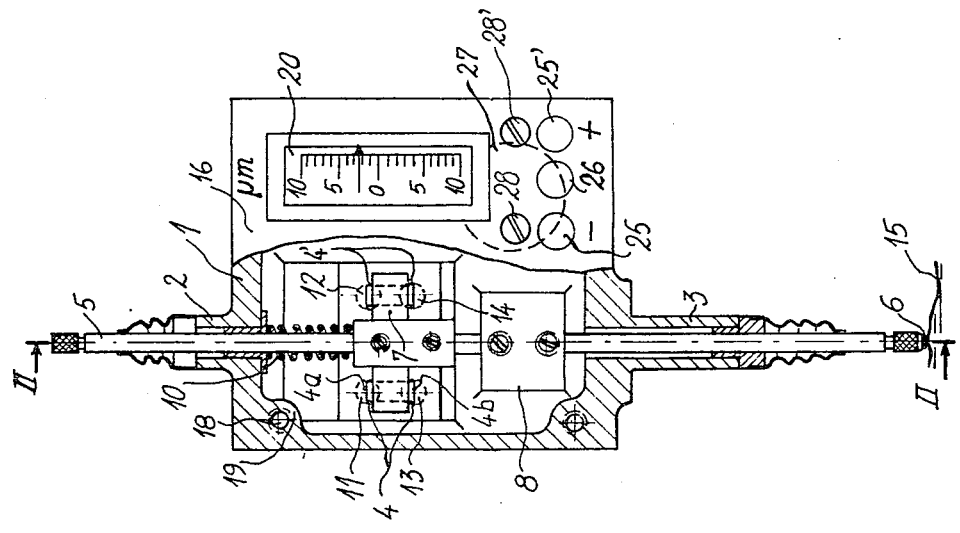

Referring to FIGS. 1 and 2, the feeler comprises a box 1 of general parallelepipedal shape continuing in the form of two coaxial tubular portions 2 and 3, one above and the other below the box. Four photoreceivers 11–14 disposed at the corners of a square are fixed at the bottom of the box. A fixed diaphragm in the form of two rectangular windows 4, 4' having a height slightly less than the photoreceiver diameter, is disposed in front of the photoreceivers and their top and bottom sides 4a, 4'a and 4b, 4'b respectively pass through the centers of the photoreceivers 11, 12 on the one hand and 13, 14 on the other hand. A control rod 5 can slide in the tubular parts 2–3 and terminates in a hemispherical contact 6. A movable opaque mask 7 of rectangular shape is fixed on the rod 5 and its height is slightly less than the height of the fixed diaphragm. A guide member 8, in the form of a parallelepipedal block, is connected to rod 5. With the interposition of a film of grease it slides on an erect surface 9 of the base of the box. A spring 10 holds the contact 6 into contact with the component 15 under inspection. An assembly comprising four lamps 21–24 for respectively illuminating photoreceivers 11–14 through the gaps between the edges of windows 4, 4' and the edges of the mask 7 and an electronic circuit is mounted on printed board 30. Board 30 is attached to the box by means of screws (not shown) screwed into tapped holes 18 formed in the corners 19 of the box. A connector 27 at the back surface of the box enables the illuminating lamps 21-24 and the electronic circuit 30 to be supplied with current. The box is closed by a lid 16 the top of which is clasped to the box and the bottom of which is attached to the box by means of screws 17.

A needle ammeter 20 with a center zero and three signalling lamps 25, 25' and 26 are mounted on the lid.

Figure 3:
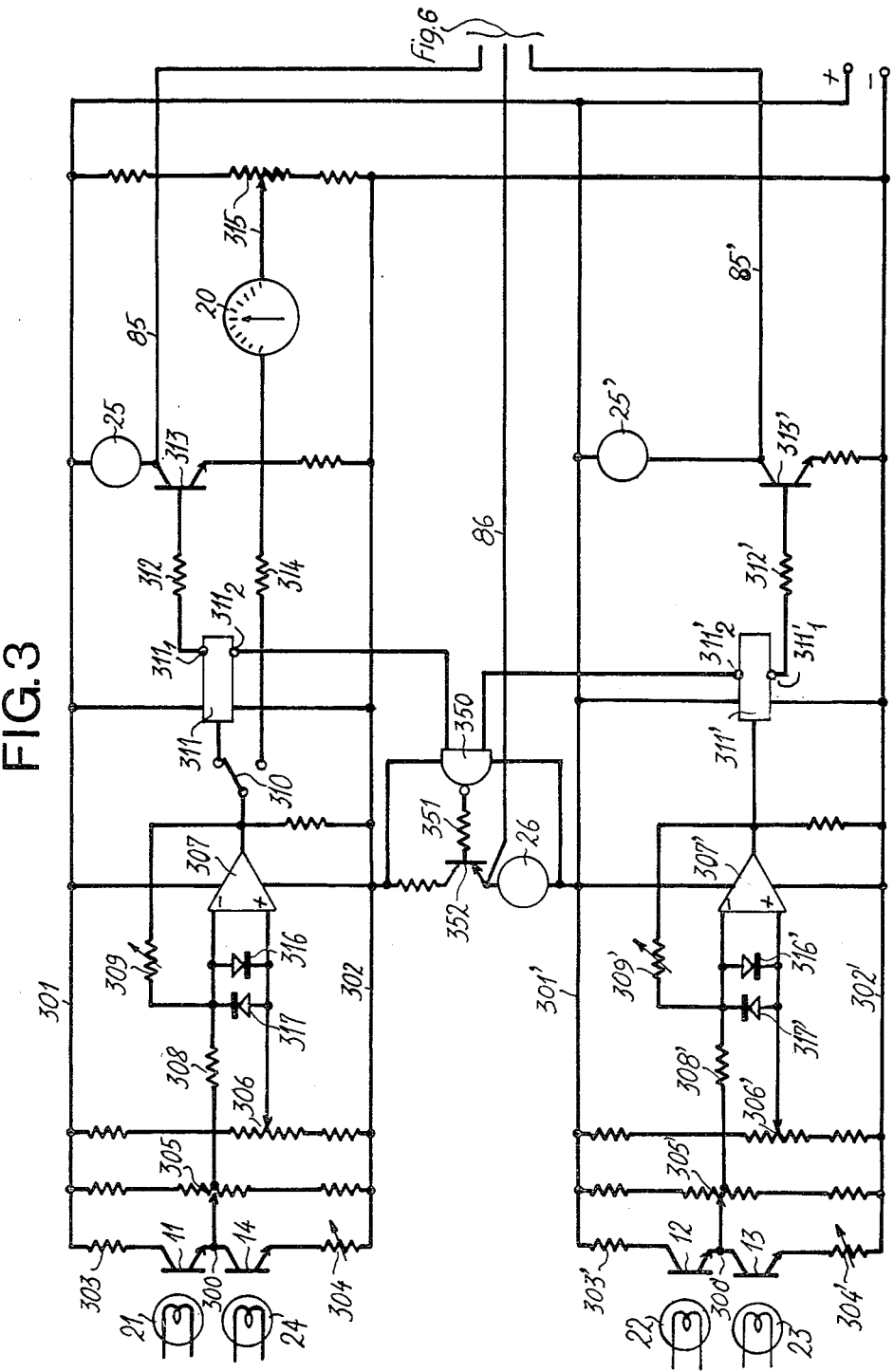
FIG. 3 represents the electronic circuit of the measuring device.

Electronic circuit 30 is shown in FIG. 3. It comprises two trigger circuits respectively controlled by the photoreceivers 11 and 14 and by the photoreceivers 12 and 13, and a NAND gate. Only one of the trigger circuits will be described, the second being identical, and its elements are denoted by the same reference numerals as the elements of the first circuit, followed by the prime sign.

The two photoreceivers 11 and 14 are connected in series with one another and with two resistors 303, 304 of the same value between the leads 301-302 of the power supply line. The potential of the common point of the two photoreceivers 300 in the case of equal illumination of the latter can be controlled by means of the potentiometer 305. The common point of the two photoreceivers 300 is connected to the inverting input of an operational amplifier 307 via a resistor 308 and the non-inverting input of this amplifier is connected to the slider of a potentiometer 306. The amplifier gain is controlled by means of a variable resistor 309. The output of the operational amplifier 307 is connected via an inverter 310 (there is no inverter such as 310 in the second trigger circuit) to a bistable circuit 311, such as a Schmitt trigger. The output of this trigger is connected via a resistor 312 to an amplifier transistor 313 in the collector circuit of which the signalling lamp 25 is connected.

The second output of inverter 310 is connected by resistor 314 to the center-zero micro-ammeter 20. The micro-ammeter output is brought, by means of potentiometer 315, to a reference potential which is the same as the reference potential at the non-inverting input of the operational amplifier 307. Two diodes 316 and 317 are connected in opposite directions between the inputs of amplifier 307 to limit the input voltage in the two directions, positive and negative.

The second outputs of the trigger circuits 311 and 311' are connected to a NAND gate 350. The output of this gate is connected via a resistor 351 to an amplifier transistor 352 in the emitter circuit of which is disposed the signalling lamp 26.

To check whether a tolerance is complied with, the apparatus operates as follows.

When the control rod 5 moves in one direction, e.g. upwards, illumination of the photoreceivers 11 and 12 decreases and illumination of the photoreceivers 13 and 14 increases. Assuming that the photoreceivers have identical sensitivity and that at equilibrium, i.e. for identical illumination of the cells, the potentials of the common points 300 and 300' are respectively equal to the potentials of the sliders of the potentiometers 306 and 306', for a given position of rod 5 the trigger 311 will go to state 1 and trigger 311' to state 0. The signalling lamp 25 will illuminate and the signalling lamp 25' will go out.

If, however, on equilibrium, the potentials of the common points 300 and 300' are different from the potentials of the sliders of the potentiometers 306 and 306', the triggers 311 and 311' will change over at different positions of the rod 5. The positions corresponding to the triggering in the two networks will be adjusted by adjusting the potentiometers 306 and 306' or the resistors 304 and 304' (or 303 and 303') which are assumed to be variable. These triggering positions are spaced apart from the balancing point for which the ammeter indicates zero by distances respectively equal to the positive and negative tolerances.

When the control rod is in an intermediate position between the two changeover positions, the two triggers 311 and 311' are in the same logic state. The two outputs $311_1$ and $311'_1$ are both at the low level and the two outputs $311_2$ and $311'_2$ are both at the high level. The npn transistors 313 and 313' are cut off and the lamps 25 and 25' are extinguished. The NAND gate 350 has a low level output signal which will cause the pnp transistor 352 to conduct, so that the lamp 26 illuminates.

Any displacement of the movable rod 5 beyond a predetermined tolerance will cause the lamp 26 to go out and one or other lamp 25 or 25' to be simultaneously illuminated, depending upon whether the movement outside the tolerance is positive or negative along the axis of rod 5.

When the instrument is used for measuring a dimension, switch 310 is so positioned as to connect the output of amplifier 307 to the input of micro-ammeter 20 via resistor 314. The displacement of rod 5 is measured by the needle of the micro-ammeter and the measure sensitiveness is adjusted by means of variable resistor 309.

It should be noted that the symetrical mounting of the pairs of photoreceivers controlling the same trigger circuit with respect to the center of the square formed by the four photoreceivers makes the apparatus insensitive to the mechanical play in the transverse direction of the control rod, which does not affect the illumination differences of the photoreceivers of a pair, and any play due to flexure of the control rod resulting in an oblique position of the mask 7. Such oblique position would in fact cause variations of the illumination of the photoreceivers 11 and 14 on the one hand, and 12 and 13 of the other hand, in the same sense, but these variations cancel one another out since it is their difference which forms the input signal of each trigger circuit.

FIGS. 4A and 4B show a dimensional inspection apparatus with an optical head without a slidable control rod.

An illuminating lamp 55, a mirror 56 inclined at 45° to the beam emitted by the lamp, and four photoreceivers 51-54 are disposed in a box 50. The mouthpieces of a number of bunches of optical fibres 62, 64 and 70 are disposed at the location of the image of the lamp in relation to the mirror. By way of example, the bunches of fibres 62 and 64 comprise two fibres and the bunch 70 comprises eight fibres. The bunches of fibres 62 and 64 are bent and their ends are fixed to a bar 58 and are situated opposite and near the photoreceivers 52 and 54. The optical conduits 70 pass through the hollow rod 57 and terminate in the end section plane 59 thereof. Two bunches 61 and 63 each of two optical fibres lead from this end section plane 59 and terminate opposite and near the photoreceivers 51 and 53, their ends being held by the bar 58.

The two photoreceivers 52 and 54 are mounted on an assembly 60, the position of which can be adjusted by means of the screw 65 so that the spacing between the ends of the bunches of fibres 62 and 64 and the photoreceivers 52 and 54 can be adjusted. A diaphragm 66 formed with apertures can be inserted into the assembly 60 in order suitably to diaphragm the beams of light falling on the photoreceivers 52 and 54 in dependence on the coefficient of reflection of the component 15 whose dimensions are to be measured or checked.

A connector 67 situated on the back surface of the box enables the lamp 55 and the electronic circuit 30 to be supplied with power.

FIG. 5 shows the end plane 59 of the optical feeler rod. It will be seen that the ends of the fibres of bunch 70 for illuminating the component 15 form a circle surrounding the end of the two fibres of the bunch 61 and of the two fibres of the bunch 63 which form a square. The luminance picked up by the fibres 61 and 63 and, hence, the illumination of the cells 51 and 53, depend on the distance d between the end of the rod of the optical feeler and the surface of the component 15. As in the case of the apparatus shown in FIGS. 1 and 2, therefore, it is possible to measure dimensions and check tolerances.

Figure 6:
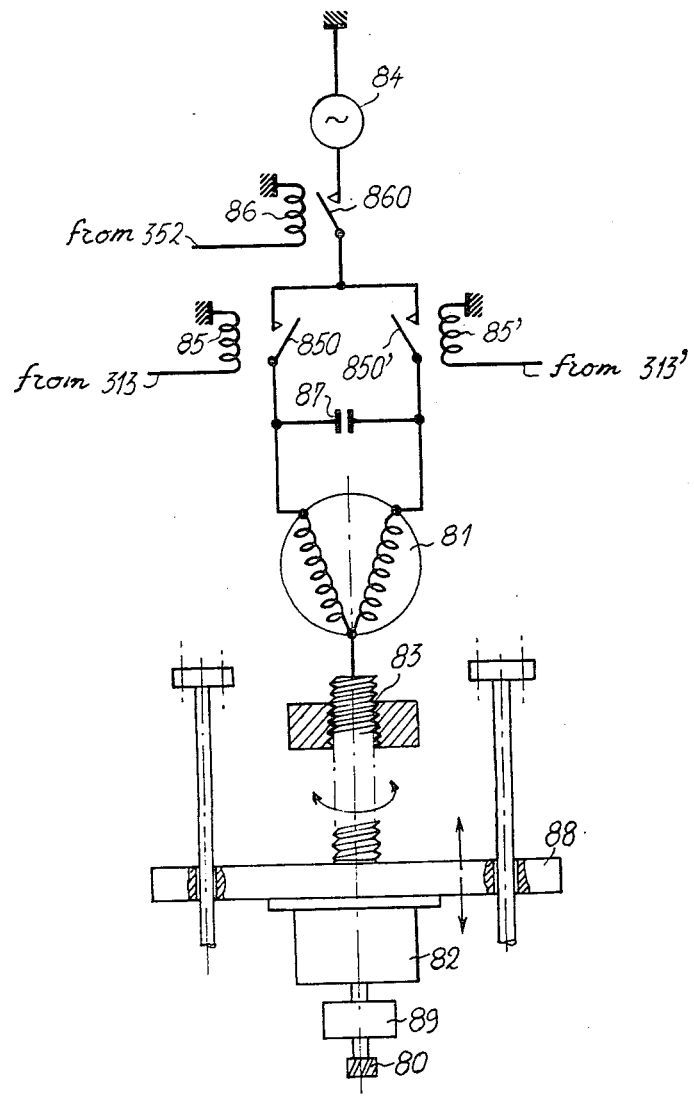
FIG. 6 is an electrical diagram of a positioning follower device according to the invention.

FIG. 6 relates to a system for very accurate positioning of an object, e.g. a cutting tool. Toll 80 is positioned in respect of translatory movements by a motor 81, which will be assumed to be a diphase motor, and is driven in rotation by means of a motor 82. Motor 81 drives a micrometer screw 83 whih displaces the tool 80 and motor 82 in a given direction, e.g. vertically. The position of the head of the tool 80 is to follow the position of the contact head 6 or the position of the optical contact head 59. The electronic circuit is the same as in FIG. 3 except that the lamps 25, 25' and 26 may be omitted and that windings of relays 85, 85' and 86 are provided respectively in the collector circuits of the transistors 313 and 313' and in the emitter circuit of transistor 352. Motor 81 is powered by an a.c. supply 84 via a switch 860 controlled by relay 86 and either of the two switches 850 or 850' respectively controlled by relay 85 or 85'. A capacitor 87 is connected between the two windings of the diphase motor 81 as is conventional. Motor 81 drives the micrometer screw 83 which drives a platform 88 which is prevented from rotating and on which the motor 82 and a reduction gear 89 are mounted, reduction gear 89 bearing the tool 80.

It will be apparent that depending upon whether lamp 25 or lamp 25' is illuminated motor 81 will rotate in one or other direction and is stopped when the lamp 26 is illuminated as a result of the switch 860 opening.

The photoreceivers used in the circuit according to FIG. 3 are preferably phototransistors or photodiodes and the illuminating lamps are preferably electroluminescent diodes.

What I claim is:

1. Apparatus for detecting whether a measured dimension deviates from a nominal value by a predetermined increment comprising
   a feeler assembly formed of a box having two coaxial tubular portions, one above and one below said box, and a control rod slideably mounted in the tubular portions of said box;
   said control rod having a contact at one of its ends;
   four photoelectric receivers mounted on one side of the box
   a fixed diaphragm comprising two rectangular windows, the first of said windows being placed in front of a first pair of said receivers and the second of said windows being placed in front of a second pair of said receivers;
   a movable mask fixed to said rod, said mask having a rectangular shape, moving in front of said windows so as to leave a gap between the edges of said mask;
   spring means biasing the contact at the end of said control rod in contact with the component under inspection;
   illuminating means for said photoelectric receivers for illumination through the gaps between the edges of the windows and the edges of the mask;
   the movement of said rod through said feeler assembly varying the masked areas of the windows whereby the two diagonally oriented pairs of photoelectric receivers on opposite corners of the photoelectric receiver array each receive a differential illumination through said windows depending upon the position of said control rod and mask along the dimension of the component being tested for feeding the differential output of said illumination of two trigger circuits; and
   an electronic circuit having two trigger circuits, one being a first trigger circuit receiving the differential output signal of one pair of diagonally oriented photoelectric receivers and delivering a first detection signal when the input signal exceeds a predetermined positive value and the other being a second trigger circuit receiving a differential output signal of the other pair of diagonally oriented photoelectric receivers and delivering a second detection signal when the input signal, due to the differential illumination, exceeds a predetermined negative value; and a gate connected to said first and second trigger circuits and delivering a third detection signal when said two trigger circuits are simultaneously inoperative.

* * * * *